Sept. 11, 1956      C. J. TWEEDIE      2,762,227
SAW CHAIN LINKAGE
Filed March 1, 1954
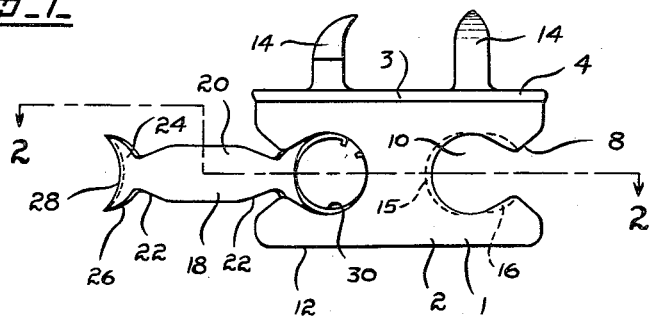
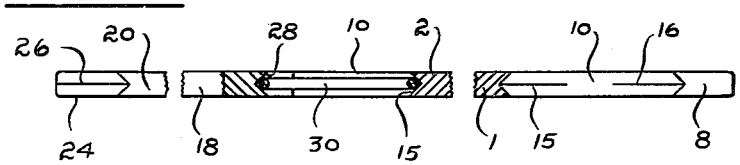
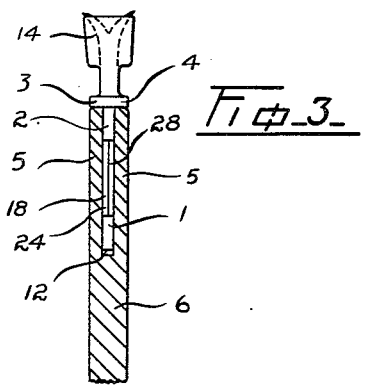
INVENTOR
CHARLES JAMES TWEEDIE
ATTORNEY

United States Patent Office 2,762,227
Patented Sept. 11, 1956

2,762,227

SAW CHAIN LINKAGE

Charles James Tweedie, Fanny Bay, British Columbia, Canada

Application March 1, 1954, Serial No. 413,339

3 Claims. (Cl. 74—249)

My invention relates to improvements in saw chain linkage.

The objects of the present invention are to provide a linkage which is entirely free from rivets which must be removed when substituting one cutter or raker link for another or in case of any breakage which may occur to any part of the chain; to form a chain which is perfectly smooth on its side faces, thus reducing wear on the flanges of the cutter bar; to provide a chain which rides on the edges of the cutter bar flanges without bottoming on the base of the chain groove defined by the flanges of the cutter bar, and also to provide a linkage which will enable a chain to be conveniently disconnected and reconnected without increasing the normal slack in the saw chain and without having recourse to the use of any tools other than a spike or other convenient pry. A still further object is to provide a saw chain which is extremely thin having all cutting links and their connecting links of the same thickness, as will be more fully described in the following specification and shown in the accompanying drawings, in which:

Figure 1 is an elevational view of one cutting link and one connecting link.

Figure 2 is an enlarged sectional plan view of the invention taken on the line 2—2 of Figure 1.

Figure 3 is an end elevational view of a cutting link and a connecting link carried thereby, said links being shown within the chain groove of a cutter bar of a chain saw.

Figure 4 is an elevational view of a spring keeper ring.

In the drawings like characters of reference indicate corresponding parts in each figure.

The numeral 1 indicates generally a main or cutting link of a saw chain which consists of a planetary body portion 2 having an upper flange 3 projecting on both sides of the body portion and forming a head 4 which is adapted to slidably engage the side flanges 5 of a chain saw cutter bar 6, see Figure 3. The cutting link 1 is provided at each end with a V-shaped slot 8 which communicates at its base with a substantially circular opening 10. The lower edge 12 of the cutting link is preferably straight as shown in Figure 1 and is adapted to be engaged by polygonal faces of a drive sprocket (not shown) to impart endwise movement to the saw chain. Obviously any other desired driving means, such as a tooth or transverse groove may be provided on or within the body portion 2 for driving means for said chain, none of which form part of the invention. The head 4 of the cutting link is provided with one or more cutting or raker elements 14.

The substantially circular openings 10 are provided with two V-shaped grooves 15 and 16 which taper out along the vertical axis of each opening 10, which grooves are preferably milled out with a tool of the same diameter as the opening and by working the tool inwardly along the longitudinal axis of the opening towards the centre of the link and outwardly along the longitudinal axis of the opening towards the adjacent V-shaped slot 8.

The cutting links are connected by connecting links 18 having a stretcher 20 which is reduced in width at opposite ends as at 22. A crescent shaped head 24 is provided at the extremities of the stretcher 20. The convex edge of each head 24 is provided with a V-shaped ridge or tongue 26 which slidably engages the groove 16 of the adjacent cutting link 1 and each head is also provided on its concave edge with a groove 28. A C-shaped ring or keeper 30 of spring wire is adapted to be sprung into the openings 10 and be cradled in the grooves 15 and 28 and exert a thrust between the cutting links and the connecting links to keep them in assembled position when the chain is slack or when not in operating position upon the cutter bar 6 of a chain saw.

When in use, the saw chain has sufficient slack so that with the machine at rest, it is possible to lift a few links of the chain out of the chain groove on the straight side of the cutter bar sufficiently to pry out keepers of any cutting link that it may be desirable to replace, and move the cutting link first in the direction of one connecting link a distance equal to the depth of the groove 16, so that the crescent shaped head 24 may be removed from the opening. Similar movement of the cutting link relative to the complementary connecting link will release said cutting link, so that it may be removed from the chain. A reversal of the above movement will connect the substitute connecting link into the chain, leaving it necessary only to replace the two keepers 30 by springing them into position.

What I claim as my invention is:

1. A chain comprising main links and connecting links, said main links having a slot in each end and a substantially circular opening adjacent to and communicating with said slot to define a throat, said connecting links having a stretcher with an arcuate head at each end, each head being adapted for insertion into an opening of the main link and to thereby reduce the size of said opening, said head and that part of the reduced opening which is adjacent the throat having a complementary tongue and groove and a keeper resiliently retained in the opening adapted to bear against the head of the connecting link to maintain the tongue and groove of the head and the opening in rocking engagement.

2. A chain comprising main links and connecting links, said main links having a slot in each end and a substantially circular opening adjacent to and communicating with said slot to define a throat, said connecting links having a stretcher with an arcuate head at each end, each head being adapted for insertion into an opening of the main link and to thereby reduce the size of said opening, said head and that part of the reduced opening which is adjacent the throat having a complementary tongue and groove, said head being crescent shaped and grooved on its concave edge, the inner half periphery of each opening in the main link having a groove and a C-shaped keeper fitted in said grooves between the head and the periphery of the opening to maintain the head of the stretcher in contact with the periphery of the opening adjacent the throat.

3. A chain comprising main links and connecting links, said main links having a slot in each end and a substantially circular opening adjacent to and communicating with said slot to define a throat, said connecting links having a stretcher with an arcuate head at each end, each head being adapted for insertion into an opening of the main link and to thereby reduce the size of said opening, said head and that part of the reduced opening which is adjacent the throat having a complementary tongue and groove and a keeper resiliently retained in the opening adapted to bear against the head of the connecting link to maintain the tongue and groove of the head and the opening in rocking engagement.

References Cited in the file of this patent

UNITED STATES PATENTS

| | | |
|---|---|---|
| 1,184,260 | Prindle | May 23, 1916 |
| 1,598,853 | Daw | Sept. 7, 1926 |
| 1,708,131 | Guindon | Apr. 9, 1929 |
| 2,065,931 | Alling | Dec. 29, 1936 |
| 2,583,243 | Tweedie | Jan. 22, 1952 |

FOREIGN PATENTS

| | | |
|---|---|---|
| 221,661 | Switzerland | Dec. 16, 1942 |